(12) United States Patent
Yamamoto et al.

(10) Patent No.: US 6,383,963 B1
(45) Date of Patent: May 7, 2002

(54) SINTERED ALUMINA-BASED CERAMICS AND PROCESS FOR PRODUCING SAME

(75) Inventors: Hiroshi Yamamoto, Ichinomiya; Satoshi Iio, Kagamigahara, both of (JP)

(73) Assignee: NGK Spark Plug Co., Ltd, Aichi (JP)

( * ) Notice: Subject to any disclaimer, the term of this patent is extended or adjusted under 35 U.S.C. 154(b) by 0 days.

(21) Appl. No.: 09/599,226

(22) Filed: Jun. 22, 2000

Related U.S. Application Data

(62) Division of application No. 09/103,112, filed on Jun. 23, 1998.

(30) Foreign Application Priority Data

Jun. 26, 1997 (JP) .............................................. 9-185779
Dec. 10, 1997 (JP) .............................................. 9-361900

(51) Int. Cl.⁷ .............................................. C04B 35/10
(52) U.S. Cl. ........................ 501/127; 501/128; 501/153
(58) Field of Search ................................ 501/127, 128, 501/153

(56) References Cited

U.S. PATENT DOCUMENTS

| 4,892,850 A | 1/1990 | Hori |
| 5,447,894 A | 9/1995 | Yasuoka et al. |

FOREIGN PATENT DOCUMENTS

| GB | 2 288 597 | 10/1995 |
| JP | 61-256963 | 11/1986 |
| JP | 63-134551 | 6/1988 |
| JP | 04-239701 | 8/1992 |
| JP | 6-87649 | 3/1994 |
| JP | 07-257963 A | 10/1995 |
| JP | 7-277814 | 10/1995 |
| JP | 8-67553 | 3/1996 |
| JP | 40-8067553 | 3/1996 |
| JP | 09-087008 A | 3/1997 |
| JP | 08-101115 | 11/1997 |
| JP | 9-289267 | 11/1997 |

OTHER PUBLICATIONS

Masaki Yasuoka et al., "High–Strength and High–Fracture–Toughness Ceramics in the $Al_2O_3/LaAl_{11}O_{18}$ Systems" Journal of the American Ceramic Society, vol. 78, No. 7 (1995), pp:1853–1856.

Shuzo Kanzaki et al., "Microstructural Control of Alumina–Based and Silicon Nitride–Based Ceramics—An Approach to the Synergistic Effect of Diverse Properties", National Industrial Research Institute of Nagoya, pp:161–169 No Date Available.

Garcia et al., "Microstructure Development in In Situ Reinforced Reaction–Bonded Aluminum Niobate–Based Composites", Journal of the American Ceramics Society, vol. 79 (1996), pp. 2266–2270.

Chen et al., " In Situ Alumina/Aluminate Platelet Composites", J. Am. Ceram. Soc. 75(9):2610–12 (1992).

Kingery et al., Introduction to Ceramics:728–730 (1960).

*Primary Examiner*—Paul Marcantoni
(74) *Attorney, Agent, or Firm*—Morrison & Foerster LLP

(57) ABSTRACT

Alumina-based ceramics are thermally stable because of their high melting point and excellent materials in wear resistant properties and chemical stability. However, they contradictly have such a problem that fracture toughness is low, and its improvement is desired. The present invention provides such sintered alumina-based ceramics and their production process that have rendered to grow alumina grains anisotropically and fracture simultaneously attain high flexural strength and fracture toughness by sintering the formed mixture comprising $Al_2O_3$, 0.05–2.5 mol % of VA metal oxide and 0.01–4 mol % $SiO_2$, relative to $Al_2O_3$, respectively.

22 Claims, No Drawings

SINTERED ALUMINA-BASED CERAMICS AND PROCESS FOR PRODUCING SAME

This application is a division of U.S. Ser. No. 09/103,112, filed Jun. 23, 1998, and is still pending.

FIELD OF THE INVENTION

This invention relates to sintered alumina-based ceramics and a process for producing same in which alumina grains are rendered to be grown anisotropically and which enables to achieve both high flexural strength and high fracture toughness. More specifically, this invention relates to sintered alumina-based ceramics and a process for producing same which are preferable for use as structural materials, wear resistant materials or cutting tools, each of which requires high flexural strength and fracture toughness, or suitable for use under high-temperature conditions.

DEFINITION

The grouping of the elements is based on the international periodic table of the IUPAC version.

BACKGROUND OF THE INVENTION

Alumina is a material which is thermally stable because of its high melting point and excellent in wear resistant properties and chemical stability. However, the fracture toughness of sintered alumina is generally low of around 3 MPa·m$^{0.5}$ so that the main current of a structural material is non-oxide ceramics having high fracture toughness such as silicon nitride and the like now. However, it is considered that alumina is one of the essentially excellent materials in anti-oxidizing and anti-corrosive properties as compared with non-oxide ceramics since alumina is an oxide. Further, alumina can be sintered in the air, and therefor, it has the advantage of being possible to regulate its production cost low as compared with non-oxide ceramics which require the control of the sintering atmosphere. Accordingly, it is expected that the improvement of sintered alumina to have high fracture toughness will broaden the range of its applications still more.

The following processes have been disclosed for improving the fracture toughness of alumina, the lack of which has been one of the drawbacks of alumina, by increasing the resistance to crack propagation with anisotropic oxide grains introduced into sintered alumina:

(1) dispersing process of platelet-like alumina grains into alumina matrices (Japanese Patent Kokai Publication JP-A-61-256963 (1986));

(2) growing process of platelet-like alumina grains comprising the steps of admixing fluoride such as LiF, NaF, KF etc. with alumina and providing a liquid phase in the course of sintering (Japanese Patent Kokai Publication JP-A-6-87649 (1994));

(3) growing process of platelet-like alumina grains by adding a very small amount, e.g., around several hundred ppm of $SiO_2$ to alumina (PROGRESS IN CERAMIC BASIC SCIENCE: CHALLENGE TOWARD THE 21ST CENTURY, 161–169(1996));

(4) growing process of platelet-like alumina grains by heat-treating sintered alumina after sintering (Japanese Patent Kokai Publication JP-A-7-257963 (1995));

(5) depositing process of platelet-like lanthanum β-aluminate into alumina matrices (Japanese Patent Kokai Publication JP-A-63-134551 (1988));

(6) adding process of $SiO_2$ in addition to the process (5) (Japanese Patent Kokai Publication JP-A-7-277814 (1995));

(7) depositing process of needle-like $AlNbO_4$ grains by admixing around 40% of niobium pentoxide into alumina and sintering the resultant mixture (J.Am.Ceram.Soc.,79,(9),p. 2266–2270 (1996)); and (8) mixing process of isotropic alumina crystal grains having a long diameter of not more than 3 μm and an aspect ratio of not more than 1.5, with anisotropic alumina crystal grains having a long diameter of not less than 10 μm and an aspect ratio of not less than 3 at a predetermined mixing ratio, respectively, by way of e.g., admixing alumina powder with metal oxide having an eutectic point with alumina of not more than 1600° C. to mold the resultant admixture, and heating the molded product from the room temperature up to its sintering temperature at a rate of not less than 8° C./min. by means of e.g., microwave heating in the course of sintering (Japanese Patent Kokai Publication JP-A-9-87008 (1997)).

DISCUSSIONS ON THE RELATED ART

In the course of eager investigations toward the present invention it has turned out that the aforementioned conventional processes involve the following problems.

In the process (1), platelet-like grains are added in order to improve the flexural strength. However, these platelet-like grains act as an inhibitor of sintering in this process wherein the platelet-like grains are premixed so that a compact sintered product cannot be obtained when large platelet-like grains are added, or the platelet-like grains are added in an increased amount for the purpose of improving the fracture toughness.

In the process (2), when alumina grains are grown in the platelet-like shape only by being effected by fluoride, that is, without admixing any disperse-phase-forming agent such as zirconia, carbides, whisker and the like (samples Nos. 8 to 12 in Example 2), fracture toughness is 4.8 MPa·m$^{0.5}$ or less. Accordingly, it is difficult to say that these samples have sufficient fracture toughness.

In the process (3), the fracture toughness is 3.5 MPa·m$^{0.5}$ at most, which can be obtained by the addition of 300 ppm of $SiO_2$, and accordingly, the improving effect of this process in fracture toughness is very little. Further, the addition of only $SiO_2$ results in producing a heterogeneous sintered product in which coarse plate like grains and fine platelet-like alumina grains are co-existing. This causes lowering both the flexural strength and fracture toughness.

In the process (4), the size of platelet-like grains is large and flexural strength value remains low to be in the range of from 380 to 530 MPa. Further, this process requires heat-treating after sintering so that production steps correspondingly increase, which are not preferable in the aspect of production cost.

In the process (5), the fracture toughness is 3.4 MPa·m$^{0.5}$ at most, which indicates that the improving effect of this process in fracture toughness is little.

In the process (6), simultaneous admixing of $SiO_2$ additionally forms alumina grains into platelet-like shape and makes possible to attain high fracture toughness. However, lanthanum-β-aluminate is a material which has a lower Young's modulus than that of alumina. Thus it would be better to grow anisotropically alumina which has high Young's modulus for increasing the resistance to crack propagation (improving fracture toughness).

In the process (7), the flexural strength value is limited as low as 320 MPa due to the large size of needle-like $AlNbO_4$ grains in spite that fracture toughness indicates a high value of 5.3Pa·m$^{0.5}$. Further, this process is not preferable in the aspect of cost, since the product contains 40% of costly niobium pentoxide.

The process (8) does not always provide products having satisfied properties, besides it is not preferable in the aspect of cost and the like since it requires the use of a special microwave heating apparatus.

SUMMARY OF THE DISCLOSURE

It is a primary object of the present invention to provide sintered alumina-based ceramics having high flexural strength and fracture toughness free from the disadvantages encountered in the prior art. Further objects of the present invention will become apparent in the entire disclosure.

In order to provide sintered alumina-based ceramics having high flexural strength and fracture toughness, the present inventors advanced the steps of their studies as follows.

The present inventors expected improving the fracture toughness of alumina by growing anisotropically alumina grains in their sintered product because the anisotropic grains deflect the propagation path of cracks. In other words, the larger the degree of this deflection of the cracks, the larger the fracture toughness. Accordingly, the sintered product of anisotropically shaped grains exhibits a large extent of deflection as compared with the sintered product of equiaxial grains so that the sintered product having anisotropically shaped grains has high toughness.

Therefore, the present inventors studied assiduously to attain the purpose of growing alumina grains anisotropically in the course of sintering. Consequently, they found that sintering a formed (molded) mixture comprising $Al_2O_3$, VB metal oxide (the oxide of the metal of VB family) and $SiO_2$ causes alumina grains to grow anisotropically during sintering to produce the sintered alumina-based ceramics having high flexural strength and fracture toughness, and accomplished the present invention. Namely, in accordance with the present invention, the simultaneous addition of VB metal oxide and $SiO_2$, as compared with the addition of $SiO_2$ only, enables to grow grains having larger aspect ratio and provide a sintered product having higher fracture toughness and higher flexural strength. Further, the present invention makes it possible to prepare an excellent sintered product in density and hardness or provide a sintered product excellent in compactness.

PREFERRED EMBODIMENTS OF THE INVENTION

The present invention provides sintered alumina having high flexural strength and high fracture toughness by means of comprising VB metal oxide and $SiO_2$ and growing alumina grains anisotropically. Further, the present invention provides a process for producing same, that is, a process comprising the steps of forming a mixture comprising $Al_2O_3$, VB metal oxide and $SiO_2$, and sintering the formed mixture.

Alumina used in the invention may be the alumina used in the conventional sintered alumina ceramics and preferably be α-alumina powder of high purity (e.g., a purity of not less than 99.99%).

VB metal oxide used in the invention may be of powders commercially available. Regarding its additional ratio, one or more kind of the VB metal oxide is added preferably of from 0.05 to 2.5 mol %, more preferably of from 0.06 to 1 mol %, most preferably of from 0.08 to 0.5 mol % relative to alumina. Short of the ratio causes insufficient compactness or densification. Excess of the ratio prevents alumina grains from growing anisotropically resulting in equiaxed grains, and consequently, sufficient improving effect of fracture toughness cannot be obtained. Accordingly, neither short nor excess of the ratio is preferable.

Examples of the VB metal oxide include $Nb_2O_5$, $Ta_2O_5$, $V_2O_5$ and the like. Among them, most preferable VB metal oxide is $Nb_2O_5$ or $Ta_2O_5$, since $V_2O_5$ volatilizes during sintering offering certain difficulty in producing the target sintered product.

$SiO_2$ used in the invention may be powders commercially available of inorganic silicic acid and the like. Regarding its additional ratio, it is preferably 0.01 to 4 mol %, more preferably 0.03 to 2 mol %, most preferably 0.05 to 1 mol % relative to alumina. Short of the ratio prevents alumina grains from growing anisotropically to become equiaxed and consequently, sufficient improving effect of the fracture toughness cannot be obtained. On the contrary, excess of the ratio causes the growth of coarse particles, which results in lowering flexural strength. Accordingly, neither short nor excess of the ratio is preferable.

In order to produce the sintered product of the invention, the mixture of $Al_2O_3$, VB metal oxide and $SiO_2$ may be formed and then sintered. In the course of sintering, the sintered product is possibly changed into compact and dense state and at the same time alumina grains can be grown anisotropically. The sintering temperatures may be selected among those of the conventional range and preferably range from 1320 to 1600° C., more preferably, from 1350 to 1550° C. and most preferably, from 1380 to 1500° C. These preferable ranges of the sintering temperatures provide compact and dense sintered products. Short of the temperature cannot provide dense sintered products. Excess of the temperature makes alumina grains equiaxed to fail obtaining sufficient improving effect of fracture toughness to bring about coarse alumina grains and a lowered flexural strength. Accordingly, neither short nor excess of the sintering temperature is preferable.

Preferable sintering time is in the range of from 10 minutes to 5 hours, more preferably, from 1 to 4 hours, and most preferably, from 1.5 to 3 hours. Short of the sintering time fails to provide a compact sintered product or to promote the anisotoropic growth of alumina grains, which makes hard to obtain good properties. Excess of the sintering time makes alumina grains coarse and invites the lowering of flexural strength.

In the sintered product obtained in the invention, the aspect ratio (the ratio of a long axis to a short axis) of the alumina grains can be determined by mirror-polishing the sintered product, etching it by the application of thermal etching or other technique, and observing its microstructure by mean of SEM (Scanning Electron Microscope) or the like. When the microstructure is observed by SEM, it is preferred that alumina grains have not less than 2 of the mean aspect ratio. Less than 2 of the mean aspect ratio is not preferable, since it is little effective to the deflection of the cracks' propagation path, and therefore, high fracture toughness is hard to be obtained. More preferable mean aspect ratio is from 2 to 5.

In the sintered product obtained in the present invention, percentage by area of alumina grains having a long diameter of not less than 2 μm and less than 10 μm and aspect ratio of not less than 2, and the percentage by area of those having a long diameter of not less than 10 μm can be determined by mirror-polishing the sintered product, etching it by the application of thermal etching or other technique, observing its microstructure by mean of SEM or the like, and image-analyzing by using an apparatus for processing and analyzing images. Especially preferable sintered product, as a result of observing its microstructure by SEM and analyzing the microstructure, contains not less than 20% in terms of area of alumina grains having a long diameter of not less than 2 µm and less than 10 µm, especially of anisotropic alumina grains having an aspect ratio of not less than 2. A less amount of alumina grains makes hard to obtain deflection effect regarding the propagation path of cracks and fracture toughness which are especially desirable. Further, especially preferable sintered product contains less than 20% in terms of area of coarse alumina grains having a long diameter of not less than 10 µm. The presence of such coarse alumina grains in an amount exceeding 20% will cause fracture resulting from coarse alumina grains and make difficult to maintain especially desirable flexural strength.

Preferable sintered product of the present invention has a flexural strength of not less than 500 MPa and a fracture toughness of not less than 5 MPa·m$^{0.5}$.

The sintered product of the invention can be densified by hot pressing (HP) or hot isostatic pressing (HIP) other than normal pressure sintering which is easily operable. In order to prepare a high-density sintered product, it is preferred to prepare a sintered product having a relative density of not less than 95% followed by HIP treating the sintered product under a treating pressure of 500 to 2,000 kg/cm$^2$ at treating temperature of 1,200 to 1,600° C.

The sintered product of the present invention can be sintered in an oxidizing atmosphere or a non-oxidizing atmosphere of nitrogen gas, argon gas or the like, or in vacuum.

The mechanism of anisotropically growing process of alumina grains in the course of sintering process cannot be fully explained, but it is presumed that the liquid phase essentially consisting of $Al_2O_3$—VB metal oxide-$SiO_2$ generated in the course of sintering probably relates to the growth of highly anisotropic alumina grains.

The hardness of the sintered product of the present invention can be enhanced by adding preferably 0.01 to 0.50 mol %, relative to $Al_2O_3$, of metal oxide such as titanium oxide ($TiO_2$ and the like), rare earth metal oxide ($Y_2O_3$, $Yb_2O_3$ and the like) and the like in the sintered product. In this case, the anisotropy of alumina grains regarding their shape anisotropy is never deteriorated. Enhanced hardness extends the application of the sintered product of the invention and materials preferable to be used in hardness-requiring fields, especially in a wear-resistant member or a cutting tool can be provided by the present invention.

EXAMPLES

The sintered alumina-based ceramics and their production process will be explained more concretely as follows.

Example 1

The composition shown in Table 1 of α-alumina (purity: not less than 99.99%, mean diameter: 0.6 µm), $Nb_2O_5$ (purity: 99.9%, mean diameter: 2.0 µm) and $SiO_2$ (purity: 99.9%, mean diameter: 0.1 µm) were wet-mixed together with distilled water as their dispersant. Sintered product was prepared by sintering molded bodies obtained by CIP-forming dried powders of the resultant mixture for 2 hours at temperatures shown in Table 1 in the atmospheric air using an electrical-resistance-heating furnace.

The density of the sintered product was determined by Archimedes method. Regarding the aspect ratio of the sintered product, it was determined by the steps of mirror-polishing and then thermally etching the sintered product, selecting dozens of grains from those pictured in the SEM photograph of the observed microstructure of the sintered product, determining the ratios of the long diameter to the short diameter of each of the selected grains, and calculating the mean value of these ratios. The percentage by area of alumina grains having long diameter of not less than 2 µm and less than 10 µm and aspect ratio of not less than 2, and the percentage by area of those having a long diameter of not less than 10 µm was determined by way of mirror-polishing and then thermally etching the sintered product, observing the microstructure of the sintered product by SEM and image-analyzing the microstructures by using an apparatus for processing and analyzing images. The strength of the sintered product was determined by 3-point flexural strength measurement at room temperature in accordance with JIS R1601. The fracture toughness of the sintered product was determined in accordance with SEPB method disclosed in JIS R1607, and the hardness of the sintered product was determined in accordance with JIS R1610. The results are shown in Table 1.

As is evident from Table 1, the alumina grains in the sintered products of the present invention have a mean aspect ratio of not less than 2. The microstructure of each sintered product of the invention observed by SEM contains not less than 20% in terms of area of alumina grains having long diameter of not less than 2 µm and less than 10 µm and aspect ratio of not less than 2. Further, this microstructure contains less than 20% in terms of area of coarse alumina grains having a long diameter of not less than 10 µm. All the sintered products of the present invention had flexural strength, which had been measured at 3 points at room temperature, of not less than 500 MPa and fracture toughness of not less than 5 MPa·m$^{0.5}$. This indicates that the sintered products of the invention are excellent in flexural strength and fracture toughness.

Alumina grains contained in sample 1, in which $Nb_2O_5$ and $SiO_2$ had not been added, did not grow anisotropically and the fracture toughness of sample 1 was low.

Sample 2, in which only a very small amount of $SiO_2$ had been added, exhibited little effect of the anisotropical growth and the fracture toughness of the sample 2 was not enhanced sufficiently.

The microstructure of sample 3, in which an increased amount of $SiO_2$ had been added, was inhomogeneous, and the flexural strength and fracture toughness of the sample 3 became low as compared with sample 2.

Alumina grains contained in sample 4, in which only $Nb_2O_5$ had been added, did not grow anisotropically and the fracture toughness of sample 4 was not enhanced sufficiently.

Sample 6, whose sintering temperature had been kept too low, was not densified sufficiently.

Alumina grains contained in sample 9, whose sintering temperature had been kept too high, did not grow anisotropically to a sufficient extent and became coarse, and sample 9 exhibited low flexural strength.

Alumina grains contained in sample 12, in which too much amount of $SiO_2$ had been added, became coarse, and sample 12 exhibited low flexural strength.

Alumina grains contained in sample 16, in which too much amount of $Nb_2O_5$ had been added, did not grow anisotropically to a satisfied extent to become nearly equiaxed, and the fracture toughness of sample 16 was only a little enhanced.

Table 1 (See attached Table 1.)

Example 2

Samples 7 and 10 obtained in Example 1 was HIP-treated for 1 hour in an Ar atmosphere at 1300° C. under 1,000 Kg/cm$^2$ for densification.

Evaluation of the thus obtained sintered products, that is, each evaluation of density, mean aspect ratio, the percentage by area of alumina grains having long diameter of not less than 2 μm and less than 10 μm and aspect ratio of not less than 2, and the percentage by area of those having a long diameter of not less than 10 μm, flexural strength, fracture toughness and hardness was performed by the same procedure of Example 1. The results are shown in Table 2.
Table 2 (See attached Table 2.)

As is evident from Table 2, HIP treating after sintering can densify the sintered product much more while keeping the shape anisotropy of alumina grains without changing their aspect ratio. Consequently, it will be understood that the flexural strength can be increased without lowering the fracture toughness and that materials having a flexural strength of not less than 600 MPa and a fracture toughness of not less than 5 MPa·m$^{0.5}$ can be obtained.

Example 3

The flexural strength at elevated temperature and thermal-shock-resistance temperature of sample 1 (Comparative Example), sample 7 and sample 7-HIP (HIP-treated of sample 7), which had been obtained in Examples 1 and 2, were measured.

Flexural strength at elevated temperature was determined by flexural strength measured at 3 points at high temperature of 1,000° C. according to JIS R 1604. Thermal-shock-resistance test was carried out by manufacturing 4×6×25 mm of a sample piece by grinding, keeping the sample piece at predetermined temperature, quenching it by putting it into water of 20° C. and confirming whether there is a crack appeared in it or not by applying dye penetration method. The highest difference of the temperature at which no clack had been confirmed in the sample piece after quenching was determined to as a thermal-shock-resistance temperature. The results are shown in Table 3.
Table 3 (See attached Table 3.)

All the evaluated samples of the present invention have flexural strength at 1000° C. of not less than 300 MPa and thermal-shock-resistance temperature of not less than 250° C., which indicate that excellent materials in flexural strength at elevated temperature and thermal shock resistance can be provided by the present invention.

Example 4

The same procedure of Example 1 was repeated except adding $TiO_2$ or $Yb_2O_3$ in the ratios shown in Table 4 to the composition of sample 7 to prepare a sintered product. The sintering temperature was kept as shown in Table 4. Each of the sintered products was HIP-treated for 1 hour at the temperature shown in Table 4 under 1,000 kg/cm$^2$ for densification.

Evaluation of the thus obtained sintered products regarding density and the percentage by area of alumina grains having long diameter of not less than 2 μm and less than 10 μm and aspect ratio of not less than 2, and the percentage by area of those having a long diameter of not less than 10 μm was performed by the same way of Example 1. The results including hardness, fracture toughness, fracture strength etc. are shown in Table 4.
Table 4 (See attached Table 4.)

As is evident from Table 4, the addition of $TiO_2$ or $Yb_2O_3$ effects the recover of the hardness up to be not less than 1,700 while keeping the shape anisotoropy of alumina grains, flexural strength and fracture toughness.

In summary, the following meritorious effects can be achieved by the present invention. In the sintered alumina-based ceramics, alumina grains are grown anisotropically during sintering by sintering the mixture comprising $Al_2O_3$, VB metal oxide and $SiO_2$. Consequently, sintered alumina-based products having excellent flexural strength and fracture toughness are provided.

It should be noted that modification obvious in the art may be done without departing the gist and scope of the present invention as disclosed herein and claimed hereinbelow as appended.

TABLE 1

| sample No.[1] | Starting composition[2] (outer mol %) | | Sintering temperature (° C.) | Relative density[3] (%) | Mean aspect ratio | 2 μm ≦ Long diameter < 10 μm Aspect ratio ≧ 2 (% by area) | Long diameter ≧ 10 μm (% by area) | Flexural strength (MPa) | Fracture toughness (MPa · m$^{0.5}$) | Hardness HV30 |
|---|---|---|---|---|---|---|---|---|---|---|
| | $Nb_2O_5$ | $SiO_2$ | | | | | | | | |
| 1* | 0.00 | 0.00 | 1,600 | 98.5 | 1.0 | 0 | 10 | 450 | 2.8 | 1,750 |
| 2* | 0.00 | 0.07 | 1,600 | 97.8 | 1.4 | 10 | 15 | 460 | 3.0 | 1,750 |
| 3* | 0.00 | 0.50 | 1,600 | 97.2 | 1.7 | 15 | 30 | 430 | 2.7 | 1,740 |
| 4* | 0.10 | 0.00 | 1,400 | 98.5 | 1.0 | 0 | 35 | 400 | 2.7 | 1,440 |
| 5 | 0.10 | 0.05 | 1,400 | 97.8 | 3.7 | 40 | 15 | 560 | 5.3 | 1,500 |
| 6 | 0.10 | 0.07 | 1,300 | 74.9 | —[4] | —[4] | —[4] | —[4] | —[4] | —[4] |
| 7 | 0.10 | 0.07 | 1,400 | 97.7 | 3.7 | 40 | 5 | 580 | 5.4 | 1,520 |
| 8 | 0.10 | 0.07 | 1,450 | 98.5 | 4.2 | — | — | 550 | 6.0 | — |
| 9* | 0.10 | 0.07 | 1,650 | 98.8 | 1.2 | 10 | 60 | 240 | 4.4 | 1,550 |
| 10 | 0.10 | 0.20 | 1,420 | 97.6 | 3.7 | 40 | 5 | 580 | 5.4 | 1,520 |
| 11 | 0.10 | 2.00 | 1,460 | 97.5 | 4.0 | 45 | 15 | 560 | 5.5 | 1,520 |
| 12* | 0.10 | 5.00 | 1,550 | 97.3 | 3.5 | 30 | 30 | 440 | 5.0 | 1,510 |
| 13 | 0.50 | 0.07 | 1,400 | 97.8 | 3.4 | 40 | 10 | 560 | 5.3 | 1,510 |
| 14 | 1.00 | 0.07 | 1,400 | 97.8 | 2.9 | 35 | 5 | 570 | 5.2 | 1,500 |
| 15 | 2.00 | 0.07 | 1,400 | 97.8 | 2.4 | 25 | 5 | 530 | 5.1 | 1,500 |
| 16* | 3.00 | 0.07 | 1,400 | 97.9 | 1.5 | 15 | 5 | 490 | 4.0 | 1,460 |

Note:
[1]Samples of numbers to which the code "*" attached are comparative products, and others are within the scope of the invention;
[2]Starting composition is based on 100% by mol of alumina contained in each of samples;
[3]This value is relative to 100% of the theoretical density calculated from composition ratio; and
[4]Aspect ratio, flexural strength and fracture toughness were not measured because this sample was not fully densified.

TABLE 2

| sample No. | Relative density[5] (%) | Mean aspect ratio | 2 μm ≤ Long diameter < 10 μm Aspect ratio ≥ 2 (% by area) | Long diameter ≥ 10 μm (% by area) | Flexural strength (MPa) | Fracture toughness (MPa · m[0.5]) | Hardness HV30 |
|---|---|---|---|---|---|---|---|
| 7-HIP | 99.2 | 3.7 | 40 | 10 | 660 | 5.4 | 1,650 |
| 10-HIP | 99.1 | 3.7 | 40 | 10 | 650 | 5.4 | 1,650 |

Note:
[5]This value is relative to 100% of the theoretical density calculated from the composition ratio.

TABLE 3

| sample No.[6] | Flexural strength at 1000° C. (MPa) | Thermal-shock resistable temperature (° C.) |
|---|---|---|
| 1* | 230 | 220 |
| 7 | 300 | 250 |
| 7-HIP | 410 | 260 |

Note
[6]Samples of numbers to which the code "*" is attached are comparative products, and others are within the scope of the invention.

TABLE 4

| sample No. | Additive | Amount of additive[7] (outer mol %) | Sintering temperature (° C.) | HIP-treating temperature (° C.) | Relative density[8] (%) | 2 μm ≤ Long diameter < 10 μm Aspect ratio ≥ 2 (% by area) | Long diameter ≥ 10 μm (% by area) | Flexural strength (MPa) | Fracture toughness (MPa · m[0.5]) | Hardness HV30 |
|---|---|---|---|---|---|---|---|---|---|---|
| 16 | TiO$_2$ | 0.20 | 1,380 | 1,280 | 99.5 | 45 | 5 | 680 | 5.0 | 1,740 |
| 17 | TiO$_2$ | 0.30 | 1,380 | 1,280 | 99.5 | 45 | 5 | 670 | 5.0 | 1,750 |
| 18 | Yb$_2$O$_5$ | 0.05 | 1,440 | 1,300 | 99.5 | 45 | 10 | 650 | 5.0 | 1,750 |

Note:
[7]This value is based on 100% by mol of alumina contained in each of samples;
[8]This value is relative to 100% of the theoretical density calculated from the composition ratio.

What is claimed is:

1. A sintered ceramic comprising a matrix phase of anisotropic alumina grains which are grown anisotropically and a grain boundary phase, said grain boundary phase comprising alumina, an oxide of a group VB element and SiO$_2$, said sintered ceramics having a flexural strength at room temperature of not less than 500 MPa and a fracture toughness of not less than 5 MPa m$^{0.5}$, said sintered ceramics having been produced by forming a mixture comprising Al$_2$O$_3$, the oxide of the group VB element and said SiO$_2$ and sintering the mixture at a temperature of 1,320 to 1,600° C., wherein said oxide of the group VB element is present in an amount of 0.05 to 2.5 parts by mol, and said SiO$_2$ is present in an amount of 0.01 to 4 parts by mol, relative to 100 parts by mol of Al$_2$O$_3$, respectively.

2. The sintered ceramic as defined in claim 1, wherein said oxide of the group VB element is present in an amount of 0.06 to 1 parts by mol, and said SiO$_2$ is present in an amount of 0.03 to 2 parts by mol, relative to 100 parts by mol of Al$_2$O$_3$, respectively.

3. The sintered ceramic as defined in claim 1, wherein said oxide of the group VB element comprises Nb$_2$O$_5$.

4. The sintered ceramic as defined in claim 1, wherein said oxide of the group VB element is selected from the group consisting of Nb$_2$O$_5$ and Ta$_2$O$_5$.

5. The sintered ceramic as defined in claim 1, comprising not less than 20% by area of the alumina grains having a long diameter in the range of 2 μm to less than 10 μm, and up to 20% by area of the alumina grains having a long diameter of at least 10 μm in the microstructure of the sintered ceramics when said microstructure is observed by SEM.

6. The sintered ceramic as defined in claim 1, comprising not less than 20% by area of the alumina grains having a long diameter in the range of 2 μm to less than 10 μm, and up to 20% by area of the alumina grains having a long diameter of at least 10 μm in the microstructure of the sintered ceramics when said microstructure is observed by SEM.

7. The sintered ceramic as defined in claim 1, wherein the alumina grains have a mean aspect ratio of not less than 2.

8. The sintered ceramic as defined in claim 1, further comprising titanium oxide and a rare earth metal oxide.

9. A sintered-ceramic comprising alumina, an oxide of a VB group element and SiO$_2$, wherein said alumina comprises anisotropically grown alumina grains, and said alumina is present in an amount exceeding 96% by weight of said sintered ceramics, said sintered ceramics having a flexural strength at room temperature of not less than 500 MPa and a fracture toughness of not less than 5 MPa m$^{0.5}$ said sintered ceramics having been produced by forming a mixture comprising Al$_2$O$_3$, the oxide of the group VB element and SiO$_2$ and sintering the formed mixture at a temperature of 1,320 to 1,600° C.

10. The sintered ceramic as defined in claim 9, wherein said oxide of the group VB element comprises Nb$_2$O$_5$.

11. The sintered ceramic as defined in claim 9, wherein said oxide of the group VB element is selected from the group consisting of Nb$_2$O$_5$ and Ta$_2$O$_5$.

12. The sintered ceramic as defined in claim 10, wherein said oxide of the group VB element is present in an amount of at least 0.05 parts by mol, and said SiO$_2$ is present in an amount of 0.01 to 4 parts by mol, relative to 100 parts by mol of Al$_2$O$_3$, respectively.

13. The sintered ceramic as defined in claim 11, wherein said oxide of the group VB element is present in an amount of 0.06 to 1 parts by mol, and said SiO$_2$ is present in an amount of 0.03 to 2 parts by mol, relative to 100 parts by mol of Al$_2$O$_3$, respectively.

14. The sintered ceramic as defined in claim 9, comprising not less than 20% by area of the alumina grains having a long diameter in the range of 2 μm to less than 10 μm, and up to 20% by area of the alumina grains having a long diameter of at least 10 μm in the microstructure of the sintered ceramics when said microstructure is observed by SEM.

15. The sintered ceramic as defined in claim 9, wherein the alumina grains have a mean aspect ratio of not less than 2.

16. The sintered ceramic as defined in claim 9, further comprising titanium oxide and a rare earth metal oxide.

17. A sintered ceramic comprising a matrix phase of anisotropically grown alumina grains and a grain boundary phase, the grain boundary phase comprising alumina, a group VB element oxide and $SiO_2$, wherein said anisotropically grown alumina grains are grown in a liquid phase during sintering, and said liquid phase forming said grain boundary phase, said sintered ceramics having a flexural strength at room temperature of not less than 500 MPa and a fracture toughness of not less than 5 MPa $m^{0.5}$.

18. The sintered ceramic as defined in claim 17, wherein said VB metal oxide is present in an amount of 0.05 to 2.5 parts by mol, and said $SiO_2$ is present in an amount of 0.03 to 4 parts by mol, relative to 100 parts by mol of $Al_2O_3$, respectively.

19. The sintered ceramic as defined in claim 18, comprising not less than 20% by area of the alumina grains having a long diameter in the range of 2 μm to less than 10 μm, and up to 20% by area of the alumina grains having a long diameter of at least 10 μm in the microstructure of the sintered ceramics when said microstructure is observed by SEM.

20. The sintered ceramic as defined in claim 19, wherein the alumina grains have a mean aspect ratio of not less than 2.

21. The sintered ceramic as defined in claim 13, wherein said oxide of the group VB element comprises $Ta_2O_5$.

22. The sintered ceramic as defined in claim 9, wherein said VB metal oxide comprises $Ta_2O_5$.

\* \* \* \* \*